Patented Feb. 16, 1954

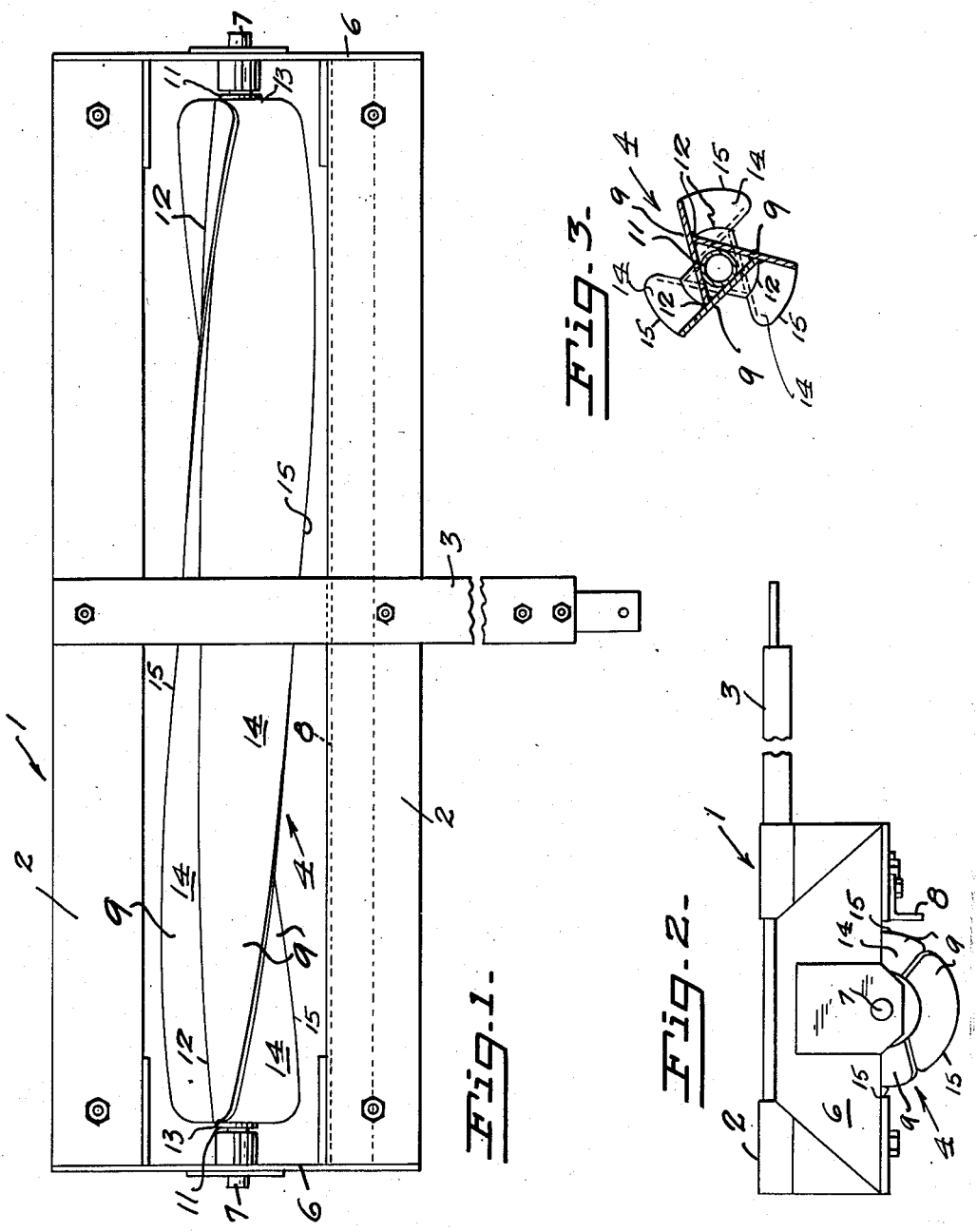

2,669,079

UNITED STATES PATENT OFFICE 2,669,079

ROTATING STALK CUTTING ROLLER

Jacobus M. Landry, Summerland, British Columbia, Canada

Application November 17, 1949, Serial No. 127,922

6 Claims. (Cl. 55—118)

This invention relates to an agricultural implement and particularly to cutting and crushing rollers.

The primary object of this invention is to provide an implement whereby cover crops, grass, weeds and the like can be controlled without destroying them and which leaves the cut or crushed parts of such cover crops and the like on the ground to serve as a mulch.

The advantages of this invention include the following features: the implement is adapted to be drawn by a tractor or the like over the cover crops and it has means to bend and lay down the stems of the cover crops in advance of the blades of the cutter roller; the stems are cut or crushed between the blade edges and the ground; the stems laid on the ground are cut so as to leave only a short part of the stems still standing after the passage of the roller; the weight and inertia of the mass of the implement in motion and of the tractive force are fully utilized for forcing the blades through the stems of cover crops and the like and against and into the ground by means of a rapidly revolving roller; the blades are arranged at such angle that the combined weight, inertia and traction of the implement and tractor in motion bears on only a portion of one edge at a time to press said roller edge against the reaction force of the ground; the load bearing on each point of the edges shifts rapidly along each edge as the roller revolves, and as the angular position of the blades of the roller in relation to the ground, at each point of the edges, varies greatly and rapidly; the roller does not collect material that is liable to impede the operation of the rollers; there is no necessity to sharpen the blades when the edges are dulled; the implement has a construction of rigidity yet is light and economical.

I am aware that some changes may be made in the general arrangements and combinations of the several devices and parts, as well as in the details of the construction thereof, without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a plan view of my implement.

Fig. 2 is a side view of my implement, on a reduced scale; and

Fig. 3 is a sectional view of the roller, on the same scale as Fig. 2.

In carrying out my invention I make use of a frame 1 of heavy construction. The top surface 2 of the frame is substantially flat to permit the securing of additional weights thereon, such as timbers or the like. A tongue or shaft 3 extends forwardly from about the middle of the frame for connection to a traction device, for instance to a tractor.

A roller 4 extends longitudinally in the frame between the end plates 6. Each end of the roller has a journal shaft 7 journalled in the adjacent end plate 6 so that the axis of the roller is transverse relatively to the direction of motion of the frame when drawn by a tractor or the like. The radius of the roller is larger than the distance between the axis of the journal and the bottom edges of the frame so that, in operation, the roller carries the frame and holds it off the ground.

A transverse member or cross bar 8 extends from end to end of the frame, in front of and in proximity of the roller 4. The distance between said cross bar 8 and the roller 4 is such that the cross bar 8 bends the stems of the cover crops and the like downward and toward the direction of motion of the frame 1 and holds it in that position until the roller 4 bears down on the stem.

The roller 4 in the herein illustration includes three blades, disposed substantially helically along and around a central tubular shaft 11. The blades 9 are welded to one another along their respective lines of contact 12, and to the shaft 11 at both ends 13 of the roller 4. Each blade 9 is wider than the distance between their lines of contact with each other, so that each blade has a projecting cutting wing or portion 14. The outer edge 15 of this cutting wing 14 is the cutting or crushing edge of each blade. The pitch of the helix formed by any longitudinal line or edge on each blade is one third turn in the length of the roller 4 i. e., each blade extends helically through a proportional part of the circumference of this roller. The helix can be right or left handed as desired.

Each blade 9 is of helicoidal shape, lending to the projecting wing 14 strong resistance against lateral bending or folding. No surface on the roller meets another surface under 120 degrees. The cutting edges are only three in number and revolve in circles of comparatively small diameter around the axis of the roller 4. A portion of a cutting edge is always directed toward the ground and at least one blade is always in contact with the ground and is subject to the reaction force of the ground against the load on the blade for crushing the stem thereunder. This point of contact shifts along each edge as the roller rotates. The frame, together with any additional weight thereon constitute a single mass, the weight and inertia of which form the greater part of the load bearing on the portions of the cutting edge in contact with the ground, and this load acts in forcing said cutting edges through the stems of the cover crops and the like and against or into the ground.

The implement herein described is rigid, yet light and economical in construction, it cuts along the ground at sufficiently close intervals to cut all stems in its path; the blades are comparatively thin, yet stiff, to form cutting edges which require no sharpening; the roller structure is smoothly streamlined from end to end around the tubular shaft so as to avoid recesses and thereby to prevent the accumulation of material, and also to limit the penetration of the blades through the cover crop and against and into the ground; its roller has a constant rotation around its axis for a constant horizontal motion of the implement; it results in a periodic rapid increase of the load upon each point of each cutting edge in succession as the location on the edges at which the ground reacts to the load shifts rapidly from one end toward the other end along the cutting edge of one blade for every one third turn of the roller; the blades are tangent to the tubular shaft along its entire length and inclose a center space or hub without access from the outside; the implement crushes and cuts efficiently and positively and is eminently adapted for its purposes.

I claim:

1. In an agricultural implement of the character described, a frame having an opening, a roller having a shaft rotatably mounted on said frame in said opening, means to connect said frame to a power-driven device adapted to move said frame over said surface while being supported on said roller, at least three blades along and around said shaft arranged generally tangentially thereto, the inner edge of each of said blades being secured to the face of the adjacent blade along a line intermediate the edges of said latter blade, the outer edge of each of said blades and the planes of said blades being generally helicoidal, each of said blades being secured at its longitudinal ends to said shaft and extending helically through a proportional part of the circumference of said roller.

2. In an agricultural implement of the character described, a frame having an opening, a roller having a shaft rotatably mounted on said frame in said opening, means to connect said frame to a traction device adapted to pull said frame over said surface while being supported on said roller, at least three blades along and around said shaft arranged generally tangentially thereto, the inner edge of each of said blades being secured to the face of the adjacent blade along a line intermediate the edges of said latter blade, the outer edge of each of said blades and the planes of said blades being generally helicoidal, each of said blades being secured at its longitudinal ends to said shaft and extending helically through a proportional part of the circumference of said roller, whereby during the pulling of said roller over said surface only one of said blades will contact said surface principally at one portion of its longitudinal extent, said portion of contact shifting along said longitudinal extent of said blade.

3. In an agricultural implement of the character described, a frame having an opening, a roller having a shaft rotatably mounted on said frame in said opening, said frame being adapted to be operatively connected to a driving means to be moved over a surface while being supported on said roller, a plurality of longitudinal blades along and around said shaft arranged generally tangentially thereto and having generally helicoidal planes longitudinally with respect to the axis of said shaft and intersecting one another, being joined at their lines of intersection and secured at their longitudinal ends to said shaft, each of said blades extending helically through a proportional part of the circumference of said roller.

4. In an agricultural implement of the character described, a frame having an opening, a roller having a shaft rotatably mounted on said frame in said opening, said frame being adapted to be operatively connected to a traction device to be pulled over a surface while being supported on said roller, a plurality of longitudinal blades along and around said shaft arranged generally tangentially thereto and having generally helicoidal planes longitudinally with respect to the axis of said shaft and intersecting one another, being joined at their lines of intersection and secured at their longitudinal ends to said shaft, each of said blades extending helically through a proportional part of the circumference of said roller, whereby during the pulling of said roller over said surface only one of said blades will contact said surface principally at one portion of its longitudinal extent, said portion of contact shifting along said longitudinal extent of said blade.

5. In an agricultural implement of the character described, a frame having an opening, a roller having a shaft rotatably mounted on said frame in said opening, said frame being adapted to carry selected additional weight, means to connect said frame to a traction device to be moved over a surface while being supported on said roller, a plurality of longitudinal blades along and around said shaft arranged generally tangentially thereto and having generally helicoidal planes longitudinally with respect to the axis of said shaft and intersecting one another, being joined at their lines of intersection and secured at their longitudinal ends to said shaft, each of said blades extending helically through a proportional part of the circumference of said roller.

6. In an agricultural implement of the character described, a frame having an opening, a roller having a shaft rotatably mounted on said frame in said opening, means to connect said frame to a traction device adapted to pull said frame over said surface while being supported on said roller, at least three blades along and around said shaft arranged generally tangentially thereto, the inner edge of each of said blades being secured to the face of the adjacent blade along a line intermediate the edges of said latter blade, the outer edge of each of said blades and the planes of said blades being generally helicoidal, each of said blades being secured at its longitudinal ends to said shaft and extending helically through a proportional part of the circumference of said roller, and a cross member secured to said frame in front of said roller extending downwardly to bend stems of vegetation on the ground ahead of said roller.

JACOBUS M. LANDRY.

References Cited in the file of this patent

UNITED STATES PATENTS

| Number | Name | Date |
|---|---|---|
| 223,750 | Olcott | Jan. 20, 1880 |
| 621,695 | Moss | Mar. 21, 1899 |
| 745,564 | Boggess | Dec. 1, 1903 |
| 773,088 | Mize | Oct. 25, 1904 |
| 1,381,358 | Sparks | June 14, 1921 |
| 1,429,163 | Peden | Sept. 12, 1922 |
| 2,193,009 | Riggs | Mar. 12, 1940 |
| 2,430,148 | Traver | Nov. 4, 1947 |
| 2,496,022 | Remonte | Jan. 31, 1950 |

FOREIGN PATENTS

| Number | Country | Date |
|---|---|---|
| 687,257 | France | Aug. 6, 1930 |